US007131168B2

(12) United States Patent
Pangallo

(10) Patent No.: US 7,131,168 B2
(45) Date of Patent: Nov. 7, 2006

(54) CINCH STRAP

(75) Inventor: Christopher M. Pangallo, Chicago, IL (US)

(73) Assignee: Illinois Tool Works Inc, Glenview, IL (US)

( * ) Notice: Subject to any disclaimer, the term of this patent is extended or adjusted under 35 U.S.C. 154(b) by 295 days.

(21) Appl. No.: 10/386,855

(22) Filed: Mar. 12, 2003

(65) Prior Publication Data
US 2003/0226243 A1 Dec. 11, 2003

Related U.S. Application Data

(60) Provisional application No. 60/386,825, filed on Jun. 7, 2002.

(51) Int. Cl.
F16B 2/08 (2006.01)
B65D 63/10 (2006.01)

(52) U.S. Cl. .................................................. 24/16 PB

(58) Field of Classification Search .............. 24/16 PB, 24/16 R, 30.5 P, 17 AP, 30.5 R; 292/321, 292/325; 248/74.3
See application file for complete search history.

(56) References Cited

U.S. PATENT DOCUMENTS

| 3,106,028 | A | * | 10/1963 | Baumgartner | 40/633 |
| 3,149,808 | A | | 9/1964 | Weckesser | |
| 3,257,694 | A | * | 6/1966 | Litwin | 24/16 PB |
| 3,302,913 | A | | 2/1967 | Collyer et al. | |
| 3,556,575 | A | * | 1/1971 | Farkas | 292/307 R |
| 3,597,803 | A | | 8/1971 | Van Neil | 24/16 PB |
| 3,654,669 | A | | 4/1972 | Fulton | 24/16 PB |
| 3,731,347 | A | * | 5/1973 | Caveney et al. | 24/16 PB |
| 3,747,164 | A | | 7/1973 | Fortsch | 24/16 PB |
| 3,908,233 | A | | 9/1975 | Caveney et al. | 24/16 PB |
| D255,782 | S | | 7/1980 | Forest | D9/252 |
| 4,272,900 | A | * | 6/1981 | MacLarty et al. | 40/665 |
| 4,688,302 | A | | 8/1987 | Caveney et al. | 24/16 PB |
| 4,991,265 | A | | 2/1991 | Campbell et al. | 24/16 PB |
| D326,406 | S | | 5/1992 | Anderson et al. | D8/894 |
| 5,395,343 | A | * | 3/1995 | Iscovich | 604/179 |
| 5,457,853 | A | | 10/1995 | Klein | 24/16 PB |
| 5,524,945 | A | * | 6/1996 | Georgopoulos et al. | 292/307 A |
| 5,758,390 | A | | 6/1998 | Villeneuve | 24/16 PB |
| 5,924,171 | A | | 7/1999 | Sorensen | 24/16 PB |
| 6,003,208 | A | | 12/1999 | Christian et al. | 24/16 PB |
| 6,105,210 | A | | 8/2000 | Benoit | 24/16 PB |
| 6,151,761 | A | * | 11/2000 | Thompson | 24/16 PB |
| 6,185,792 | B1 | | 2/2001 | Nelson et al. | 26/16 PB |
| 6,186,451 | B1 | | 2/2001 | Benoit | 248/74.3 |

FOREIGN PATENT DOCUMENTS

| DE | 196 22 087 A1 | | 5/1996 |
| GB | 2 243 401 A | | 10/1991 |
| GB | 2 352 477 A | | 1/2001 |
| NL | 1004356 | * | 4/1998 |

* cited by examiner

Primary Examiner—James R. Brittain
(74) Attorney, Agent, or Firm—Mark W. Croll; Paul F. Donovan

(57) ABSTRACT

A cinch strap has a monolithic latch block and strap. The latch block defines two apertures therethrough, one of the apertures being wider than the other of the apertures. The strap includes first and second strap portions, one of the strap portions being wider than the other of strap portions, and the wider of the strap portions being wider than the narrowest aperture.

17 Claims, 2 Drawing Sheets

CINCH STRAP

CROSS-REFERENCE TO RELATED APPLICATION

This application claims benefit to U.S. Provisional Patent Application Ser. No. 60/386,825, filed on Jun. 7, 2002.

FIELD OF THE INVENTION

The present invention relates generally to straps for encircling and securing objects together and, more particularly to a cinch strap or cable tie that can be secured to itself in multiple locations, to separately surround multiple objects.

BACKGROUND OF THE INVENTION

Cinch straps, or cable ties, are used frequently to secure together items such as bundles of wires or cables, or to secure wires or cables to objects. For example, when two or more wires are run along a common path, to ensure an orderly appearance cinch straps or cable ties are used to bind the wires or cables together. Similar straps can be used to secure one or several wires or cables to a frame, pipe or other object fixed in position relative to the wires. In this way, the wires can be held in an inconspicuous location, and can be protected from dangerous entanglements or other damage.

Double latch cable ties are known in which a latching mechanism has two latching receptacles, permitting separate bundling of two groups of wires or cables. For example, U.S. Pat. No. 3,654,669 teaches a cable tie having a flexible strap secured at one end to a locking frame having two strap accommodating openings therethrough. The strap is of sufficient length to first encircle one group of wires, to be inserted through a first strap accommodating opening in the locking frame, and then around a second group of wires and finally through the second strap accommodating opening in the locking frame. Thus, two groups of wires are secured on opposite sides of the locking frame by a single, double-latch cable tie.

U.S. Design Pat. 255,782 shows another double latching cable strap in which separate latching structures are provided at right angles to each other, at one end of the strap.

While straps of the type described are useful in securing individual groups or bundles of wires, cables and the like, in some situations it is desirable to provide fixed dimensioned encirclements so that when a plurality of straps are used each is tightened to the same degree, to form encirclements of the same size. Further, in some situations it is desirable and even necessary, to secure the bundled items relatively loosely, to prevent crushing. In the sometimes hectic, rapid pace environments of assembly lines, it is often difficult to ensure that a fixed level of tightening is established.

What is needed in the art is a cinch strap providing multiple encirclements, at least some with fixed minimum diameters.

SUMMARY OF THE INVENTION

The present invention meets the aforementioned and other needs by providing a cinch strap having a strap portion with discrete segments of different physical dimension, and a locking structure having strap receiving openings therethrough suitable for accommodating strap segments of different dimension.

In one form thereof, the present invention provides a cinch strap with a latch block having a plurality of apertures therethrough, each aperture having at least one strap engaging fixture therein. A strap is connected to the latch block, and has a plurality of strap segments each including a plurality of adjacent notches for selective engagement with at least one of the strap engaging fixtures. The latch block includes at least two apertures of different dimensions, and the strap has at least a first strap portion and a second strap portion of different dimensions. The first strap portion is of a dimension to fit only in a larger of the apertures and the second strap portion is of a dimension to fit in each aperture.

In another form thereof, the present invention provides a cinch strap with a latch block defining first and second apertures therethrough, and an elongated flexible strap extending from the latch block. The strap has first and second strap segments. The strap segments and the apertures are configured for the second strap segment to pass through both the apertures and for the first strap segment to enter only the first aperture.

In still another form thereof, the present invention provides a cinch strap with a monolithic body having an elongated latch block and a strap in substantial alignment therewith. The latch block has a first aperture defining a first aperture width nearest the strap and a second aperture defining a second aperture width. The strap has a first strap segment adjacent the block, the first strap segment having a first strap width greater than the second aperture width, and the strap having a distal strap portion having a second strap width narrower than the first strap width.

An advantage of the present invention is providing a cinch strap that can secure separate groups or bundles of objects including wires, cables and the like.

Another advantage of the present invention is providing a cinch strap establishing at least one fixed dimensioned encirclement for securing wires cables and the like.

Still another advantage of the present invention is providing a cinch strap capable of loosely securing bundles of wires, cables and the like.

Other features and advantages of the invention will become apparent to those skilled in the art upon review of the following detailed description, claims and drawings in which like numerals are used to designate like features.

Figure 1:
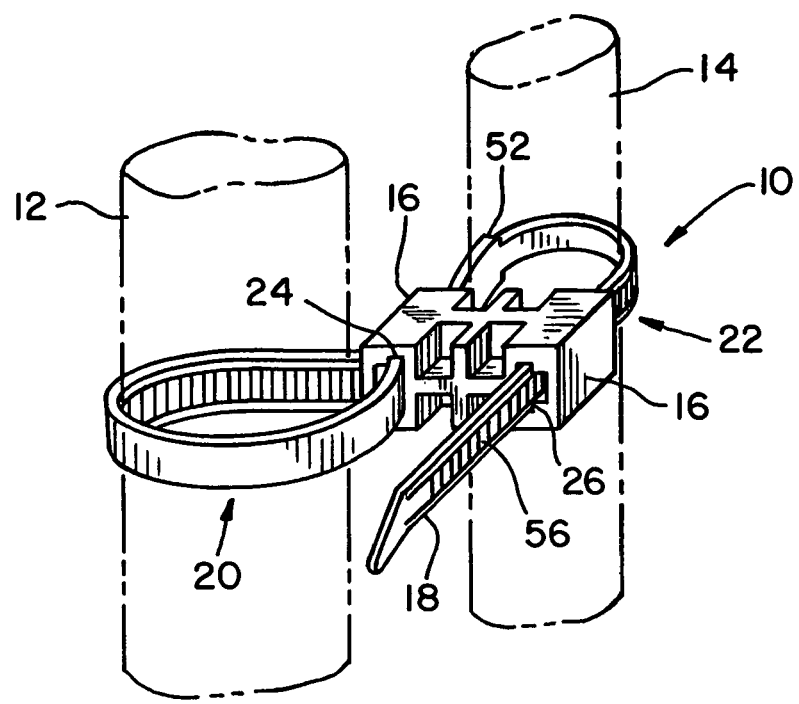
FIG. 1 is a perspective view illustrating the manner of use of a cinch strap in accordance with the present invention.
Figure 3:
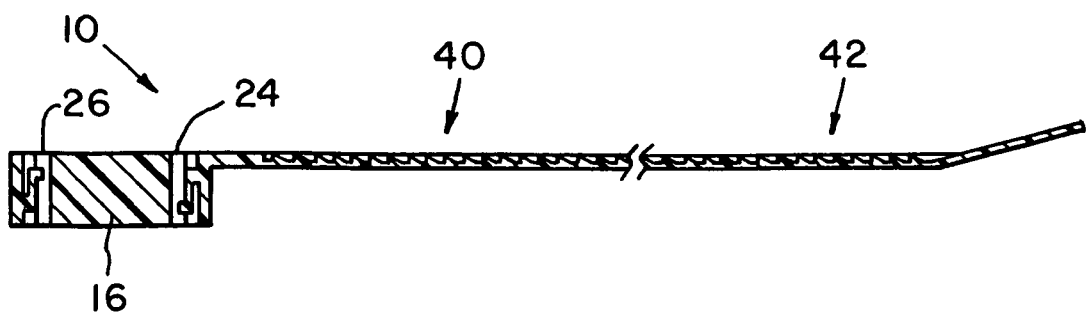
FIG. 3 is a cross-sectional view of the cinch strap shown in FIG. 2, taken along line 3—3 of FIG. 2.
Figure 2:
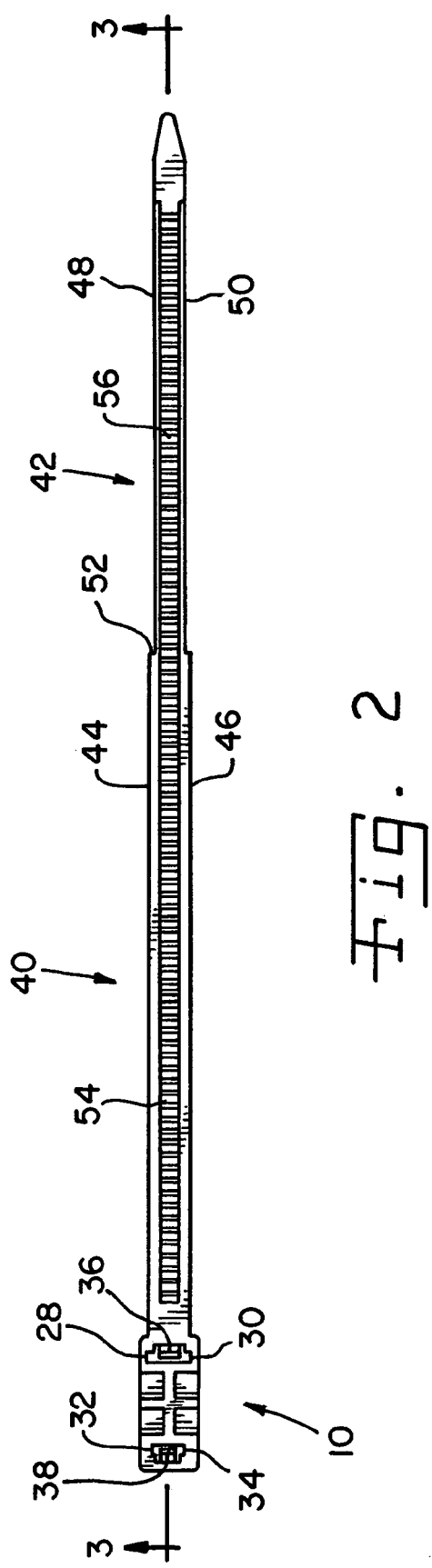
FIG. 2 is a plan view of the cinch strap shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, numeral 10 designates a cinch strap in accordance with the present invention. Cinch strap 10 is shown securing first and second objects 12 and 14, respectively, shown in phantom lines. It should be understood that objects 12 and 14 can be groups or bundles of individual items such as wires, cables and the like, or can be other types of objects. For example, cinch strap 10 can be used to secure a single wire or cable or a group of wires or cables to a frame, pipe or other object. Cinch strap 10 also can be used to secure together two or more groups or bundles of wires and or cables. It is expected that a cinch strap 10 incorporating the principles and features of the present invention will have advantageous use and application in many fields, and the present invention is not limited by the types of items held thereby. It is further noted that although not shown, it should be understood that the cinch strap 10 can be used in combination with a secondary fastener, such as, for example, a christmas tree plastic fastener or a W-prong fastener, both of which are generally known in the automobile industry and other industries, so as to attach the cinch strap 10, and thus the secured objects, to another object.

Cinch strap 10 includes a latch block 16 and a strap 18. In the exemplary embodiment shown in FIG. 1, cinch strap 10 is secured to itself by inserting strap 18 successively through latch block 16, thereby forming first and second encirclements 20 and 22 surrounding objects 12 and 14, respectively.

Latch block 16 is provided at one end of strap 18 and preferably is formed integrally therewith. Thus, cinch strap 10 is a monolithic body, advantageously of plastic or the like, including a relatively rigid or firm portion defining latch block 16 and a more flexible, thin portion defining strap 18.

Latch block 16 is a substantially solid body defining first and second strap receiving apertures 24 and 26 therethrough. Apertures 24 and 26 each extend from one side of latch block 16 to another side of latch block 16, thereby defining strap receiving openings by which portions of strap 18 can be passed through latch block 16. Apertures 24 and 26 are of different dimensions. Thus, in the exemplary embodiment illustrated, first aperture 24 defines a first aperture width between a first side 28 thereof and a second side 30 thereof. Second aperture 26 defines a second aperture width between a first side 32 thereof and a second side 34 thereof. The width of first aperture 24 is greater than the width of second aperture 26. Each first aperture 24 and second aperture 26 has a strap engaging fixture in the nature of a tooth 36 and a tooth 38, respectively, projecting into the aperture, for engaging strap 18.

Strap 18 is an elongate flexible body having a first strap segment 40 and second strap segment 42. The overall length of strap 18, and the separate lengths of segments 40 and 42 thereof are selected depending upon the size and number of objects 12 and 14 to be held thereby, and the desired sizes for encirclements 20 and 22.

Latch block 16 and strap 18 are in substantial alignment such that first aperture 24 comprises an inner aperture nearest first strap segment 40, and second aperture 26 comprises an outer aperture more distant from strap 18. First strap segment 40 is an inner strap segment, with second strap segment 42 forming an outer segment of a distal portion of strap 18 more distant from latch block 16.

First strap segment 40 defines a first strap width between a first lateral side 44 thereof and second lateral side 46 thereof. Second strap segment 42 defines a second strap width between a first lateral side 48 thereof and a second lateral side 50 thereof. The first strap width defined by first strap segment 40 is wider than the second strap width defined by second strap segment 42. A shoulder 52 is defined at the transition from first strap segment 40 to second strap segment 42.

The first strap width defined by first strap segment 40 is accommodated by the first aperture width of first aperture 24 but not by the second aperture width of second aperture 26. Thus, first strap segment 40 can be inserted through first aperture 24 but is too wide to enter or pass through second aperture 26, and shoulder 52 defined between first strap segment 40 and second strap segment 42 will abut a surface of latch block 16 adjacent second aperture 26. The second strap width defined by second strap segment 42 readily passes through first aperture 24, and is accommodated by the aperture width of second aperture 26 and is securable therein.

A first plurality of notches 54 is provided on a surface of first strap segment 40, and a second plurality of notches 56 is provided on a surface of second strap segment 42. Notches 54 and 56 thereof are sized and shaped to engage first tooth 36 and second tooth 38, respectively, although each may be of similar size and dimension. Alternatively, first tooth 36 and second tooth 38 can be of different dimensions or shapes to be received in different size notches 54 and 56, respectively.

In the use of cinch strap 10, strap 18 is extended around first object 12 and is inserted into first aperture 24. Second strap segment 42 comprises a distal portion of strap 18 and, being of smaller dimension than first strap segment 40 and first aperture 24 readily passes therethrough. So also, first strap segment 40 can be pulled into first aperture 24, with first tooth 36 therein engaging notches 54 on first segment 40, in known manner, to selectively secure the position of first segment 40 in first aperture 24. Thus, first object 12 is secured within first encirclement 20.

Thereafter, strap 18 is wrapped around second object 14, and inserted into second aperture 26, thereby forming second encirclement 22 surrounding second object 14. Second encirclement 22 can be constricted until second object 14 is securely held therein, or until shoulder 52 abuts against an outer surface of latch block 16 adjacent second aperture 26. Since first strap segment 40 is wider than second aperture 26, strap 18 can be pulled through latch block 16 at second aperture 26 only until first strap segment 40, and specifically shoulder 52, encounters second aperture 26.

Those skilled in the art should readily understand that while latch block 16 having two apertures 24 and 26 has been shown and described herein, latch block 16 could also have three or more apertures accommodating two or more strap segments 40, 42. Thus, one or several apertures can be sized to accommodate one or the other portions of strap 16 or, alternatively, three or more apertures can be provided each of different width, each accommodating a different width strap portion. Thus, strap segments can be provided of progressively narrower widths from latch block 16 to a distal tip of strap 18, to be received in successively narrower openings defined in a plurality of apertures. Shoulders such as shoulder 52 can be provided at the transitions between adjacent strap segments so that a plurality of fixed minimum diameter encirclements are formed.

Other variations in the present invention are also possible. For example, while strap 18 has been shown and described herein as having first and second segments 40 and 42 of different widths, segments 40 and 42 also could be provided of the same width, but of different thickness. Apertures 24 and 26 would then be provided of appropriate shape such that a thinner strap segment will pass through each aperture, while the thick strap segment will pass through only one aperture. Still other variations are also possible. First aperture 24 and first strap segment 40 can be of a first shape, and second aperture 26 and strap segment 42 of a different, smaller shape such that second segment 42 will pass through first aperture 24, but first segment 40 is too large in at least one dimension to pass through second aperture 26. First aperture 24 and first strap segment 40 can be substantially rectangular and second aperture 26 and second strap segment 42 triangular. Other combinations of appropriate geometric shapes, including, but not limited to rectangular, triangular and round shapes, in appropriate sizes also can be used. The present invention requires only that one portion of strap 18 is shaped in conjunction with the apertures to fit in each aperture, while another portion of strap 18 is shaped to fit in less than all of the apertures.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A cinch strap for surrounding and securing at least two objects together, said cinch strap comprising:
    a latch block having a plurality of apertures therethrough, each said aperture having at least one strap engaging fixture therein;
    a strap connecting to said latch block, said strap having a plurality of strap segments each including a plurality of adjacent notches for selectively engaging at least one of said strap engaging fixtures; and
    said latch block including at least two said apertures of different dimensions; and
    said strap having at least a first strap portion and a second strap portion of different dimensions, said first strap portion being of a dimension to fit only through and extend beyond a larger of said apertures and said second strap portion being of a dimension to fit through and extend beyond each said aperture, wherein said first strap portion has sufficient length to surround a first object and extend into said first aperture, and said second strap portion has sufficient length to surround a second object and extend into said second aperture.

2. The cinch strap of claim 1, said plurality of apertures being two apertures, and said plurality of strap portions being two strap segments.

3. The cinch strap of claim 1, said latch block having an inner said aperture and an outer said aperture substantially aligned with said strap.

4. The cinch strap of claim 3, said strap having an inner strap segment adjacent said latch block and an outer strap segment, said inner strap segment having a width greater than a width of said outer strap segment.

5. The cinch strap of claim 1, said strap having an inner strap segment adjacent said latch block and an outer strap segment, said inner strap segment having a width greater than a width of said outer strap segment.

6. The cinch strap of claim 5, said plurality of apertures being two apertures, and said plurality of strap segments being two strap segments.

7. The cinch strap of claim 6 said apertures being substantially rectangular.

8. The cinch strap of claim 7, said strap and said latch block comprising a monolithic structure.

9. A cinch strap comprising:
    a latch block defining first and second substantially parallel apertures therethrough;
    an elongated flexible strap extending from said latch block in a substantially perpendicular relationship to said apertures, said strap having first and second strap segments; and
    said strap segments and said apertures being configured for said second strap segment to pass through both said apertures and for said first strap segment to enter only said first aperture and not said second aperture.

10. The cinch strap of claim 9 said first strap segment being adjacent said latch block, and said second strap segment being a distal portion of said strap.

11. The cinch strap of claim 10, said first strap segment having a first strap width, and said second aperture having an aperture width narrower than said first strap width.

12. The cinch strap of claim 11, said latch block baying only two said apertures.

13. The cinch strap of claim 12, said strap of having only two said strap segments.

14. The cinch strap of claim 9, said strap having only two said strap segments.

15. The cinch strap of claim 9, said strap having a plurality of notches along a surface thereof, and each said aperture having a tooth therein for engaging at least some of said notches.

16. The cinch strap of claim 9, said latch block and said strap being of monolithic construction.

17. A cinch strap adapted to surround and secure at least two objects together, said cinch strap comprising:
    a latch block having a first and a second aperture extending therethrough, the first aperture being larger than the second aperture, each aperture having at least one strap engaging member therein; and
    a strap connected to the latch block, the strap having a first and a second strap segment, the first strap segment being adjacent to the latch block and the second strap segment extending from the first strap segment, distant from the latch block, the first strap segment having a dimension that allows the first strap segment to fit in the first aperture of the latch block but not the second aperture of the latch block, the second strap segment having a dimension that allows the second strap segment to fit in both apertures of the latch block, each strap segment having at least one latch block engaging member, such that to secure two objects together with the cinch strap, the strap is extended around a first object the second strap segment passes through the first aperture, the first strap segment enters the first aperture, a strap engaging member of the first aperture engages a latch block engaging member of the first strap segment to selectively secure the position of the first strap segment in the first aperture to secure the first object, the strap is extended around a second object, the second strap segment enters the second aperture, and a strap engaging member of the second aperture engages a latch block engaging member of the second strap segment to selectively secure the position of the second strap segment in the second aperture to secure the second object.

* * * * *